(12) United States Patent
Tan et al.

(10) Patent No.: US 12,705,288 B2
(45) Date of Patent: Aug. 11, 2026

(54) WEBSITE CATEGORIZATION THROUGH SEMANTIC EMBEDDINGS OF TEXT CONTEXT

(71) Applicant: Fortinet, Inc., Sunnyvale, CA (US)

(72) Inventors: Powell Patrick Cheng Tan, New Westminster (CA); Kai Xu, Coquitlam (CA); Ye Ma, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 18/759,874

(22) Filed: Jun. 29, 2024

(65) Prior Publication Data

US 2026/0003914 A1 Jan. 1, 2026

(51) Int. Cl.
*G06F 16/90* (2019.01)
*G06F 16/906* (2019.01)
*G06F 16/951* (2019.01)
*G06F 16/958* (2019.01)

(52) U.S. Cl.
CPC .......... *G06F 16/906* (2019.01); *G06F 16/951* (2019.01); *G06F 16/958* (2019.01)

(58) Field of Classification Search
CPC ..................................................... G06F 16/906
USPC ......................................................... 707/709
See application file for complete search history.

(56) References Cited

U.S. PATENT DOCUMENTS

2003/0074368 A1* 4/2003 Schuetze ............... G06F 16/355
707/E17.022

FOREIGN PATENT DOCUMENTS

CN 116881601 A * 10/2023

* cited by examiner

*Primary Examiner* — Syling Yen
(74) *Attorney, Agent, or Firm* — Law Office of Dorian Cartwright; Dorian Cartwright

(57) ABSTRACT

An unknown web page is received for categorization, for example, from a web filtering service in a web browser or a firewall. Semantic embeddings are generated by enriching the unknown web page with semantic meaning in order to determine an unknown web page vector. Proximity of the unknown web page semantic embeddings to the known web categories is calculated by comparing the average vector against the unknown web page vector. A category label for a web site category for the new web page is output based on the calculated proximity. Once known, web filtering and other network policies can be applied to the web page.

5 Claims, 7 Drawing Sheets

Figure 2:
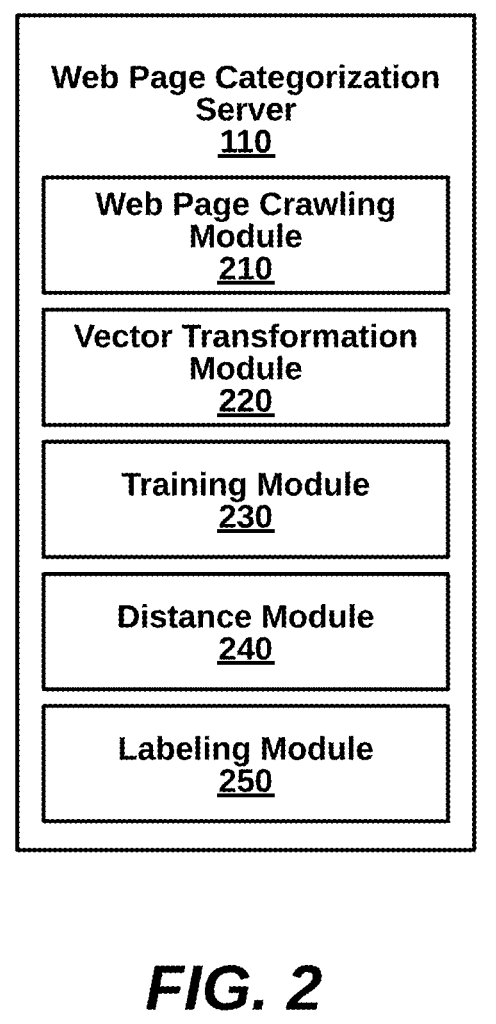

Web Page Categorization Server
110

Web Page Crawling Module
210

Vector Transformation Module
220

Training Module
230

Distance Module
240

Labeling Module
250

Inference

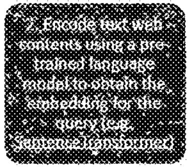

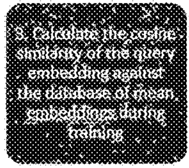

4. The cosine similarity serves as the category score. The higher the score, the more likely it is for the query to be that category.

Given two n-dimensional vectors of attributes, A and B, the cosine similarity, cos(θ), is represented using a dot product and magnitude as $$\text{cosine similarity} = S_C(A, B) := \cos(\theta) = \frac{\mathbf{A} \cdot \mathbf{B}}{\|\mathbf{A}\|\|\mathbf{B}\|} = \frac{\sum_{i=1}^{n} A_i B_i}{\sqrt{\sum_{i=1}^{n} A_i^2} \cdot \sqrt{\sum_{i=1}^{n} B_i^2}},$$

where $A_i$ and $B_i$ are the $i$th components of vectors $\mathbf{A}$ and $\mathbf{B}$, respectively.

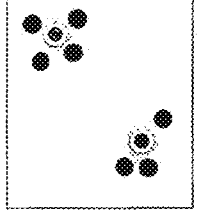

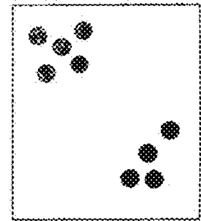

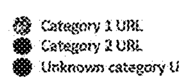

Category 1 mean embeddir
Category 2 mean embeddir

Model Training

WEBSITE CATEGORIZATION THROUGH SEMANTIC EMBEDDINGS OF TEXT CONTEXT

FIELD OF THE INVENTION

The invention relates generally to computer networks, and more specifically, for categorizing web pages through semantic embedding of text content.

BACKGROUND

Categorizing new websites is an important problem for web filtering purposes. For example, it can help identify which websites are suitable for children or in education settings and which websites may be harmful to devices.

One way to categorize websites is by building a dictionary of words found in the website and calculating the likelihood of a website being a certain category based on how frequent the words are associated with the category in the past. However, there are limitations with this approach as maintaining this dictionary of words is expensive because of various linguistic nuances such as a single word can have multiple forms, e.g. singular vs plural, different verb tenses, etc. Multiple languages need to be taken into account as well. Moreover, the same word can have multiple meanings depending on the context, e.g. bank as the financial institution vs bank as river bank. Finally, new words are continuously being added and popularized as well, e.g. Google is often used as a verb to mean searching in the Internet which did not exist prior to the launch of the company.

What is needed is a robust technique for categorizing web pages through semantic embedding of text content.

SUMMARY

To meet the above-described needs, methods, computer program products, and systems for categorizing web pages through semantic embedding of text content.

In one embodiment, URL pages of known categories on the Internet are crawled to obtain text web contents. The text web contents are transformed to vectors of numbers, for example, by pre-trained language models such as BERT. Vectors that are semantically similar also have high cosine similarity. A web page categorization model is then trained using vectors as features and the known categories as labels. The vectors with the same categories are averaged to form a vector signature for that category.

In another embodiment, an unknown web page is received for categorization, for example, from a web filtering service in a web browser or a firewall. The web page language can be detected and translated to English using a translation service. Using the same pre-trained model, a vector is created for the web page text content with an unknown category. Proximity of the unknown web page semantic embeddings to the known web categories is calculated by computing the cosine similarity of unknown web page vector against the database of labeled vector signatures.

In still another embodiment, a category label for a web site category for the new web page is output based on the calculated proximity. Once known, web filtering and other network policies can be applied to the web page.

Advantageously, computer performance is improved with better web filtering and network policy applications.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a web page categorization server of the system of FIG. 1, according to an embodiment.

FIGS. 3A-3B are schematic diagrams illustrating the process of transforming web page content to vectors of numbers from of the system of FIG. 1, according to an embodiment.

DETAILED DESCRIPTION

Methods, computer program products, and systems for categorizing web pages through semantic embedding of text content. The following disclosure is limited only for the purpose of conciseness, as one of ordinary skill in the art will recognize additional embodiments given the ones described herein.

I. Systems for Web Page Categorization (FIGS. 1-3)

Figure 1:
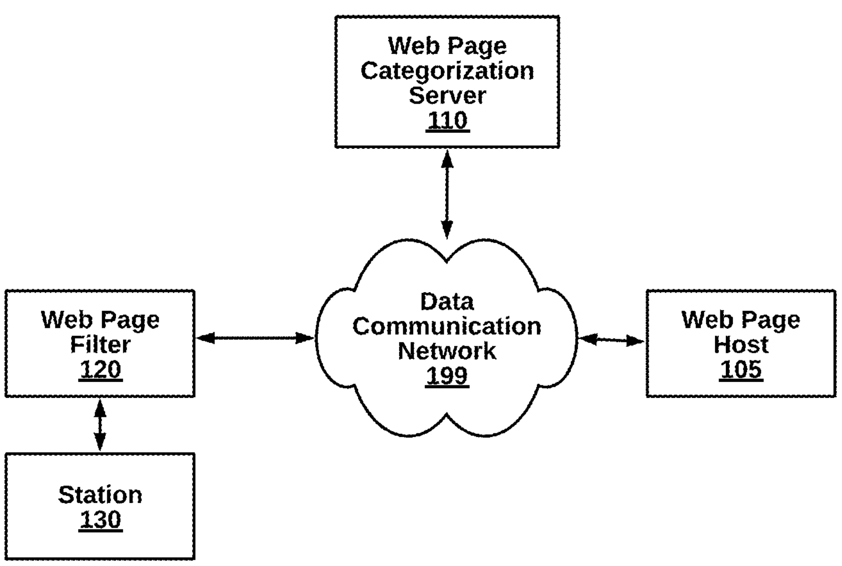
FIG. 1 is a high-level block diagram illustrating aspects of a system for categorizing web pages through semantic embedding of text content, according to some embodiments.
Figure 6:
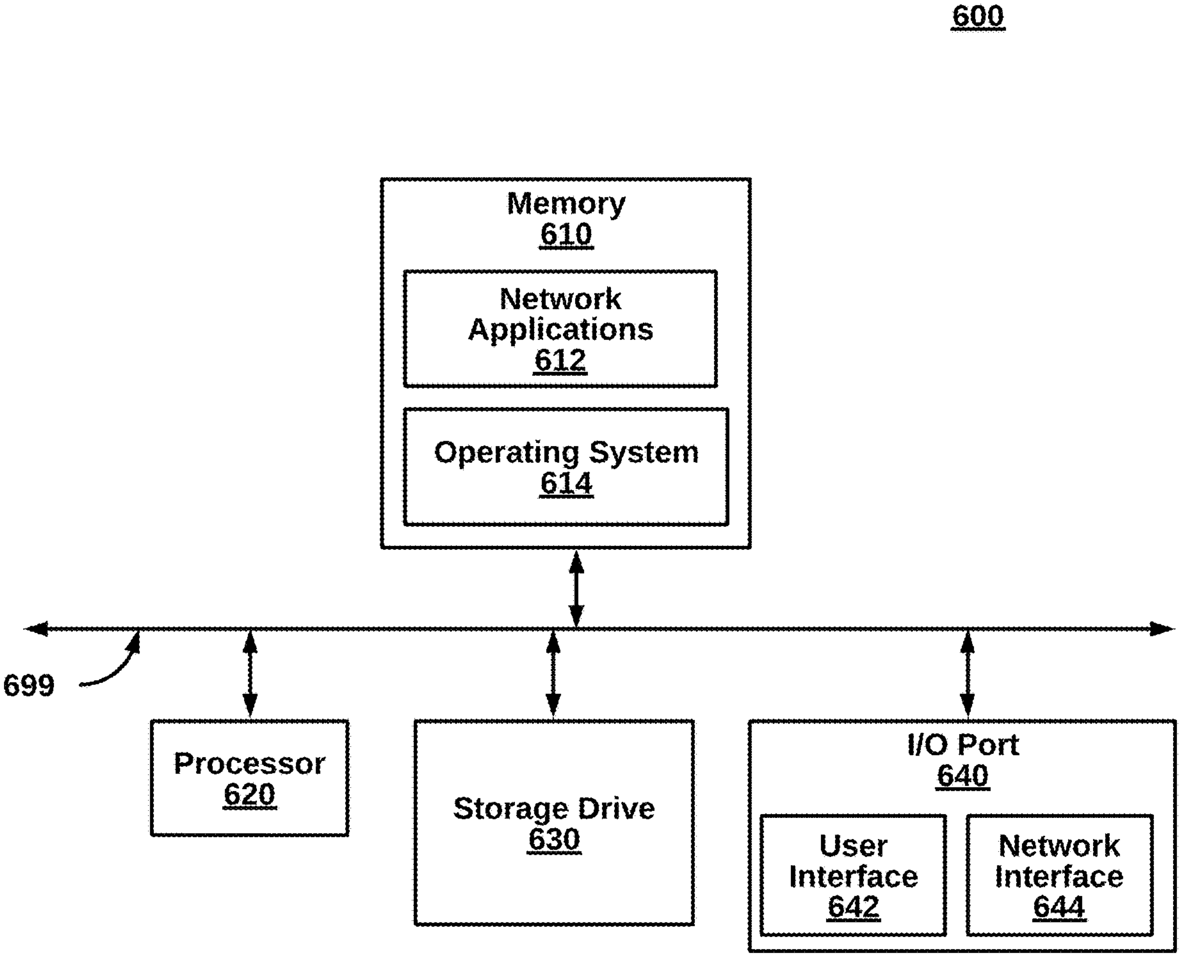
FIG. 6 is a block diagram illustrating an example computing device for the system of FIG. 1, according to an embodiment.

FIG. 1 is a high-level block diagram illustrating a system 100 for categorizing web pages through semantic embedding of text content, according to an embodiment. The system 100 includes a web page categorization server 110, a web page filter 120, an a station 130, on a data communication network. Other embodiments of the system 100 can include additional components that are not shown in FIG. 1, such as routers, switches, network gateways, and firewalls, and access points. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system via hard wire (e.g., web page categorization server 110, web page filter 120, and station 130). The components can also be connected via wireless networking (e.g., station 130). The data communication network can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, 802.11be, Wi-Fi 6, Wi-Fi 6E, Wi-Fi 7 and the like. Components can use IPv4 or Ipv6 address spaces.

In one embodiment, the web page categorization server 110 compares unknown web pages in real time against a web page categorization model to identify a category. This can be responsive to web pages requested by station 140 from web page host 105. The model can be trained with known web categories using, for example, K-means clustering or random forest. In one case, web page content is transformed to a vector for comparison against training vectors. By using pre-trained models to encode text web content to fixed-size high dimensional vectors called embeddings, training machine learning models to categorize websites can be done more efficiently. These models have already been trained on multiple datasets over the Internet and in various languages such as Wikipedia, curated Question and Answer pairs, etc. and since the language model has already been pre-trained, it already encodes semantic information in embeddings, can identify synonyms and does not need a large amount of training data or a large dictionary of words to predict well. This makes the model more general and less prone to overfitting than models trained with a smaller training dataset. In turn, this allows web page filter 120 to apply rules based on categories. For example, social media sites may be limited in bandwidth. Another example rule may completely preclude adult web sites.

The web page filter 120 can apply rules against how station 130 views web pages. A web browser or a firewall, for example, sits in a data path between the station 130 and a web page host 105. As such, rules can limit or block web pages based on categorizations. Alternatively, web page categories can lead to enhanced web services, such as a financial web page or a web page including personal data.

The station 130 can be a personal computer, a laptop, a smartphone, a tablet, a terminal, or any other appropriate processor-driven device.

FIG. 2 is a more detailed block diagram illustrating the web page categorization server 110 of the system of FIG. 1, according to one embodiment. The web page categorization server 110 includes a web page crawling module 210, a vector transformation module 220, a training module 230, a distance nodule 240 and a labeling module 250. The components can be implemented in hardware, software, or a combination of both.

The web page crawling module 210 crawling URL pages of known categories on the Internet to obtain text web contents;

The vector transformation module 220, in an embodiment, generates semantic embeddings by encoding the text web contents with semantic meaning. The text web contents are transformed to vectors of numbers, as shown in the example of FIG. 3A.

The training module 230 trains a web page categorization model using the semantic embeddings. Many different implementation are possible using, for example, K-means clustering or random forest. The model can used supervised learning by assigning the known categories. The semantic embeddings are then clustered around the known categories (e.g., SentenceTransformer). The SentenceTransformer, BERT or other pre-trained model is used to convert text contents to numerical vectors. For training, the web page categories can be obtained from publicly available datasets, Amazon Alexa Top million domains, or manually curated. An average vector of all embeddings can be calculated for each known category.

The vector transformation module 220 also receives an unknown web page for categorization (e.g., in real time). Semantic embeddings are generated by enriching the unknown web page with semantic meaning in order to determine an unknown web page vector.

Figure 3B:
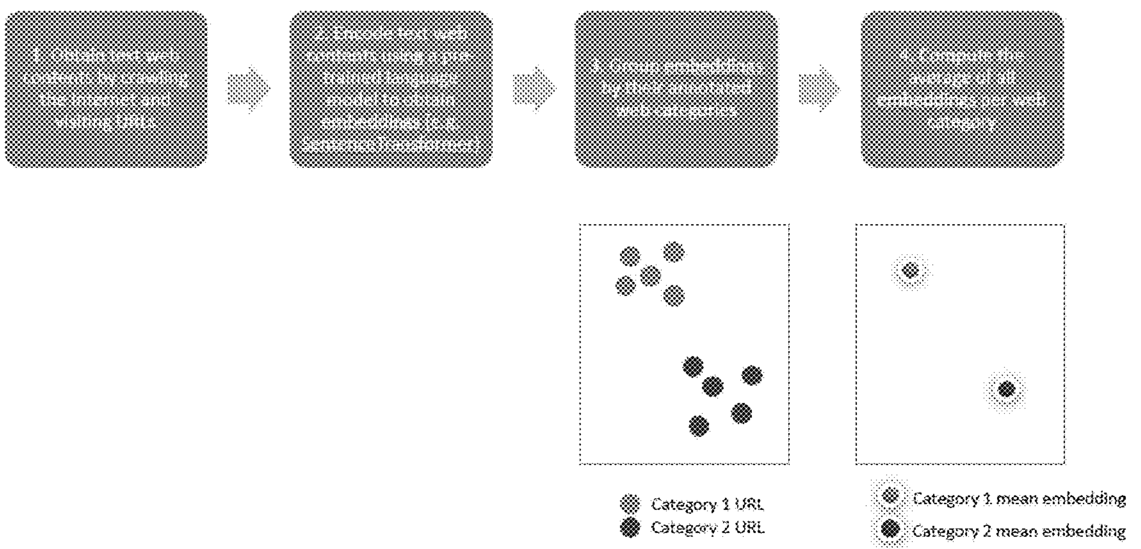

The distance module 240 can calculate proximity of the unknown web page semantic embeddings to the known web categories by comparing the average vector against the unknown web page vector. An example is shown in FIG. 3B.

The labeling module 250 outputs a label for a web site category for the new web page based on the calculated proximity.

II. Methods for Web Page Categorization (FIGS. 4-5)

Figure 4:
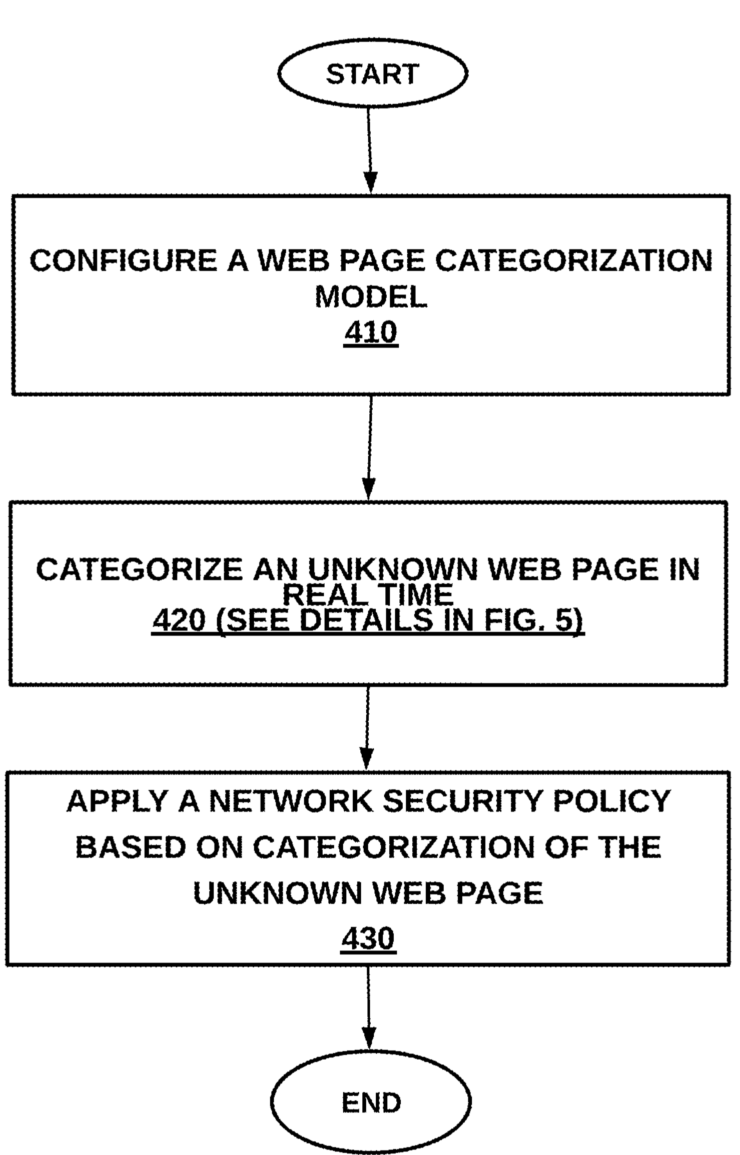
FIG. 4 is a high-level flow diagram illustrating a method for applying network filtering and policies based on web page categorizations, according to an embodiment.
Figure 5:
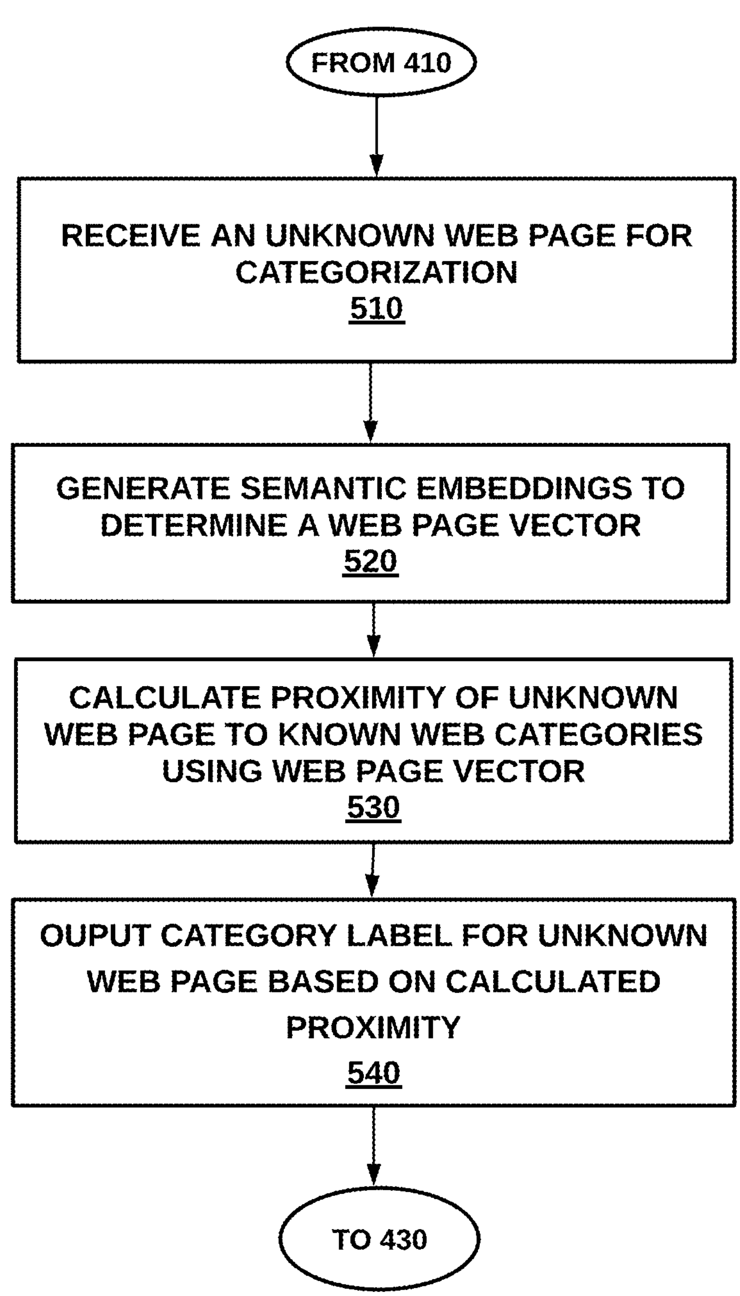
FIG. 5 is a flow diagram illustrating a step of categorizing web pages through semantic embedding of text content, from the method of FIG. 5, according to an embodiment.

FIG. 4 is a high-level flow diagram of a method 400 for categorizing web pages through semantic embedding of text content, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, a web page categorization model is configured. To do so, URL pages of known categories on the Internet are crawled to obtain text web contents. Semantic embeddings are generated by encoding the text web contents with semantic meaning, wherein the text web contents are transformed to vectors of numbers. The web page categorization model is trained using the semantic embeddings. Crawled web pages with the semantic embeddings can be clustered around the known categories. An average vector of all embeddings is computed for each known category.

At step 420, a web page is categorized in real time, as described below in association with FIG. 5. More specifically, at step 510, an unknown web page is received for categorization. At step 520, semantic embeddings are generated by enriching the unknown web page with semantic meaning in order to determine an unknown web page vector. At step 530, proximity of the unknown web page semantic embeddings to the known web categories is calculated by comparing the average vector against the unknown web page vector. At step 540, a label for a web site category is output for the new web page based on the calculated proximity.

Returning to FIG. 4, at step 430, a network security policy can be applied based on the label.

III. Computing Device for Web Page Categorization (FIG. 6)

FIG. 6 is a block diagram illustrating a computing device 600 for use in the system 100 of FIG. 1, according to one embodiment. The computing device 600 is a non-limiting example device for implementing each of the components of the system 100, including web page categorization server 110, web page filter 120, and station 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11 g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL and FORTIPHISH families of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a web page security server on a data communication network, at least partially implemented in hardware, for securing web pages based on semantic embedding of text content, the method comprising:

crawling Universal Resource Locator (URL) pages of a web page host, of known categories on the Internet to obtain text web contents;

generating semantic embeddings by encoding the text web contents with semantic meaning, wherein the text web contents are transformed to vectors of numbers;

training a web page security model using the semantic embeddings, including: assigning the known categories; clustering the semantic embeddings around the known categories; and computing an average vector of all embeddings for each known category;

receiving an unknown web page;

generating semantic embeddings by enriching the unknown web page with semantic meaning in order to determine an unknown web page vector;

calculating proximity of the unknown web page semantic embeddings to known web categories by comparing the average vector against the unknown web page vector;

outputting a category label for a web site category for the new web page based on the calculated proximity, and automatically applying rules of a security policy to block the unknown web page, based on the category label.

2. The method of claim 1, further comprising applying a filtering policy to the unknown web page based on the category label.

3. The method of claim 1, wherein outputting a category label comprises outputting highest ranked categories.

4. A non-transitory computer-readable medium in a web page categorization security server, at least partially implemented in hardware and on a data communication network, at least partially implemented in hardware, storing code that when executed, performs a method for securing web pages through semantic embedding of text content, the method comprising:

crawling Universal Resource Locator (URL) pages of a web page host, of known categories on the Internet to obtain text web contents;

generating semantic embeddings by encoding the text web contents with semantic meaning, wherein the text web contents are transformed to vectors of numbers;

training a web page security model using the semantic embeddings, including:

assigning the known categories;

clustering the semantic embeddings around the known categories; and computing an average vector of all embeddings for each known category;

receiving an unknown web page;

generating semantic embeddings by enriching the unknown web page with semantic meaning in order to determine an unknown web page vector;

calculating proximity of the unknown web page semantic embeddings to the known web categories by comparing the average vector against the unknown web page vector;

outputting a category label for a web site category for the new web page based on the calculated proximity, and automatically applying rules of a security policy to block the unknown web page, based on the category label.

5. A web page security server, on a data communication network, at least partially implemented in hardware, for securing web pages through semantic embedding of text content, the web page security server comprising:

a processor;

a network interface communicatively coupled to the processor and to a data communication network; and a memory, communicatively coupled to the processor and storing:

a web crawling module to crawl Universal Resource Locator (URL) pages of a web page host, of known categories on the Internet to obtain text web contents;

a vector transformation module to generate semantic embeddings by encoding the text web contents of known categories with semantic meaning, wherein the text web contents are transformed to vectors of numbers;

a training module to train a web page security model using the semantic embeddings, including:

assigning the known categories;

clustering the semantic embeddings around the known categories; and computing average vector of all embeddings for each known category;

a queue to receive an unknown web page, wherein the vector transformation module generates semantic embeddings by enriching the unknown web page with semantic meaning in order to determine an unknown web page vector;

a distance module to calculate proximity of the unknown web page semantic embeddings to the known web categories by comparing the average vector against the unknown web page vector;

a category labeling module to output a category label for a web site category for the new web page based on the calculated proximity, and a security policy module to automatically apply rules of a security policy to block the unknown web page, based on the category label.

* * * * *